United States Patent
Thakur

(12) 
(10) Patent No.: US 9,023,965 B2
(45) Date of Patent: May 5, 2015

(54) NONCONJUGATED CONDUCTIVE POLYMERS FOR PROTECTION AGAINST NUCLEAR RADIATION INCLUDING RADIOACTIVE IODINE

(76) Inventor: Mrinal Thakur, Auburn, AL (US)

( * ) Notice: Subject to any disclaimer, the term of this patent is extended or adjusted under 35 U.S.C. 154(b) by 650 days.

(21) Appl. No.: 13/179,876

(22) Filed: Jul. 11, 2011

(65) Prior Publication Data

US 2013/0018160 A1    Jan. 17, 2013

(51) Int. Cl.

| | | |
|---|---|---|
| C08F 132/04 | (2006.01) | |
| C08F 136/06 | (2006.01) | |
| C08F 136/08 | (2006.01) | |
| G21C 11/00 | (2006.01) | |
| G21F 9/04 | (2006.01) | |
| G21F 9/28 | (2006.01) | |
| G21F 9/06 | (2006.01) | |
| G21F 9/12 | (2006.01) | |
| C08L 21/00 | (2006.01) | |
| C08L 47/00 | (2006.01) | |

(52) U.S. Cl.
CPC . *G21F 9/04* (2013.01); *C08L 21/00* (2013.01); *C08L 47/00* (2013.01); *G21F 9/28* (2013.01); *G21F 9/06* (2013.01); *G21F 9/12* (2013.01)

(58) Field of Classification Search
USPC .......... 427/5, 6; 428/403; 526/281, 340, 335; 376/288
See application file for complete search history.

(56) References Cited

U.S. PATENT DOCUMENTS

| | | | | | |
|---|---|---|---|---|---|
| 4,694,059 | A | * | 9/1987 | Veazey | 526/340.3 |
| 4,765,928 | A | * | 8/1988 | Thakur | 252/500 |
| 5,326,855 | A | * | 7/1994 | Kahn | 528/498 |
| 7,641,977 | B2 | * | 1/2010 | Thakur | 428/432 |
| 2005/0163918 | A1 | * | 7/2005 | Thakur | 427/66 |
| 2009/0205698 | A1 | * | 8/2009 | Thakur | 136/244 |

FOREIGN PATENT DOCUMENTS

EP        1208874 A1  *  5/2002

OTHER PUBLICATIONS

Narayanan, et al, "Electrical and Optical Properties of a Noven Nonconjugated Conductive Polymer, Polynorbornene," Journal of Macromolecular Science, Pt. A: Pure and Applied Chemistry (2009) 46, 455-460.*

Quemener, et al, "Synthesis of latex particles by ring-opening metathesis polymerization," Polymer 46 (2005) 1067-1075.*

* cited by examiner

*Primary Examiner* — Fred M Teskin
(74) *Attorney, Agent, or Firm* — Minh N. Nguyen; Next IP Law Group LLP

(57) ABSTRACT

Nonconjugated conductive polymers absorb radioactive iodine, therefore are useful for protection against nuclear radiation. These polymers have at least one double bond per repeat unit. The ratio of the number of double bonds to the total number of bonds along the polymer chain is less than half. Examples of nonconjugated conductive polymers include: cis-1,4-polyisoprene (natural rubber), trans-1,4-polyisoprene (gutta percha), polybutadiene, polydimethyl butadiene, poly(b-pinene), styrene butadiene rubber (SBR), polyalloocimene, polynorbornene and many others. Through interaction with iodine atoms the double bonds in the nonconjugated polymers transform into radical cations leading to a dark color. The iodine atoms remain (immobile) bound to the polymer chain through the charge-transfer interaction, these polymers are very inexpensive and can be easily processed into any shape, structure and size. Therefore, these are useful for protection against nuclear radiation including radioactive iodine. These polymers when used as a thick cover can provide safe storage of nuclear waste materials including spent fuel rods.

11 Claims, No Drawings

NONCONJUGATED CONDUCTIVE POLYMERS FOR PROTECTION AGAINST NUCLEAR RADIATION INCLUDING RADIOACTIVE IODINE

FIELD OF THE INVENTION

This invention relates to the use of nonconjugated conductive polymers for protection against radiation, especially radioactive iodine.

BACKGROUND OF THE INVENTION

Although we do not usually need to deal with radioactive iodine such as Iodine-131 and Iodine-129, if and when any disaster strikes, as in Japan recently and Chernobyl in the past, nuclear power plants may radiate these highly harmful and cancerous materials to residential environment. As protection against radioactive iodine, people are given a pill of normal iodine to saturate the thyroid so that radioactive iodine may not deposit to a significant level in the thyroid. However, no single means of protection may fully alleviate such serious problems. In this invention, nonconjugated conductive polymers have been found as materials that efficiently interact with and absorb iodine including radioactive iodine for protection against such hazardous radiation.

SUMMARY OF THE INVENTION

Nonconjugated conductive polymers are polymers with at least one double bond per repeat unit. The ratio of the number of double bonds to the total number of bonds along the polymer chain is less than half for a nonconjugated conductive polymer, while it is equal to half for a conjugated conductive polymer. Examples of nonconjugated conductive polymers include: cis-1,4-polyisoprene (natural rubber), trans-1,4-polyisoprene (gutta percha), polybutadiene, polydimethyl butadiene, poly (β-pinene), styrene butadiene rubber (SBR), polyalloocimene, polynorbornene and many others. These polymers can be efficiently doped with iodine vapor which turns the color of the polymers dark and leads to an increase in its electrical conductivity by many orders of magnitude. Through interaction with iodine atoms the double bonds in the nonconjugated polymers transform into radical cations leading to the darker color and the resulting conductivity. The focus of this invention is on the fact that iodine gets absorbed and becomes bound within the polymer through charge-transfer interaction with the double bond. Since radioactive iodine has the same atomic number and the number of electrons (53) as normal iodine, it has similar electronic structure and activity as normal iodine atoms. Therefore, a similar level of interaction with the double bonds through the charge-transfer process will occur for radioactive iodine atoms as well. Therefore, these nonconjugated conductive polymers are useful for protection against radiation of radioactive iodine since iodine atoms become absorbed and immobile within the polymer chains.

The additional advantages of using nonconjugated polymers, such as natural rubber (polyisoprene), are that these are exceptionally inexpensive, easily processible and can be efficiently used as large sheets of any area, shape and thickness or as ground powders. These are stable under ambient conditions and sunlight and also under water. Such advantages are not offered by conjugated polymers which are usually not as stable under such conditions and are expensive. The use of nonconjugated conductive polymers for protection against radiation including radioactive iodine is novel and is the subject of the present invention. Large-scale applications of these nonconjugated conductive polymers for this use can be easily accomplished. Specific examples in this regard are discussed in the following.

DETAILED DESCRIPTION OF THE INVENTION

For storage of nuclear waste materials from nuclear power plants, in particular, to keep radioactive iodine trapped, usually silver-mordenite (a zeolite) is used. Silver reacts with radioactive iodine and makes silver iodide, and thus the iodine is kept trapped within the zeolite. However, silver-mordenite is very expensive and difficult to work with (not easily processable). Nonconjugated conductive polymers, such as natural rubbers can trap radioactive iodine as efficiently as silver-mordenite at a far less expense and provide many other benefits (ease of processibility into any shape, size and structure) as discussed.

These nonconjugated conductive polymers can also be used to protect against radiation from spent fuel rods, such as recently occurred in Japan.

Example 1

Thin sheets of cis-1,4-polyisoprene (natural rubber) were formed by depositing latex on a glass plate and drying. The sheets were placed in an enclosed container with iodine. The iodine vapor produced at room temperature interacted with the sheets and over a few hours turned the sheets black in color. With time the iodine within the container was absorbed within the polymer sheets. By weighing the iodine intake in the sheets it was determined that the maximum molar concentration of iodine was about 0.8. The electrical conductivity of the sheets increased many orders of magnitude as a result of iodine doping. Similar results were obtained when the polymer used was in the form of small particulates. Inspection over many weeks of time showed that iodine remained trapped within the polymer. When this experiment is performed using radioactive iodine (Iodine-131 and Iodine-129) similar results of iodine absorption result.

Example 2

Thin sheets of trans-1,4-polyisoprene (natural rubber gutta percha) were formed in a toluene solution on a glass plate and dried. The sheets were placed in an enclosed container with iodine. The iodine vapor produced at room temperature interacted with the sheets and over a few hours turned those black in color. With time the iodine within the container was absorbed within the polymer sheets. By weighing the iodine intake in the sheets it was determined that the maximum molar concentration of iodine was about 0.8. The electrical conductivity of the sheets increased many orders of magnitude as a result of iodine doping. Similar results were obtained when the polymer used was in form of small particulates. When this experiment is performed using radioactive iodine (Iodine-131 and Iodine-129) similar results of iodine absorption result.

Example 3

Thin sheets of poly(β-pinene) were formed from toluene solution on a glass plate and dried. The sheets were placed in an enclosed container with iodine. The iodine vapor produced at room temperature interacted with the sheets and over a few hours turned those black in color. With time the iodine within the container was absorbed within the polymer sheets. By weighing the iodine intake in the sheets it was determined that the maximum molar concentration of iodine was about 1.0. The electrical conductivity of the sheets increased many orders of magnitude as a result of iodine doping. Similar results were obtained when the polymer used was in form of small particulates. Inspection over many weeks of time showed that iodine remained trapped within the polymer. When this experiment is performed using radioactive iodine (Iodine-131 and Iodine-129) similar results of iodine absorption result.

Example 4

Thin sheets of trans-1,4-polybutadiene were formed from hexane solution on a glass plate and drying. The sheets were placed in an enclosed container with iodine. The iodine vapor produced at room temperature interacted with the sheets and over a few hours turned the sheets black in color. With time the iodine within the container was absorbed within the polymer sheets. By weighing the iodine intake in the sheets it was determined that the maximum molar concentration of iodine was about 0.8. The electrical conductivity of the sheets increased many orders of magnitude as a result of iodine doping. Similar results were obtained when the polymer used was in form of small particulates. Inspection over many weeks of time showed that iodine remained trapped within the polymer. When this experiment is performed using radioactive iodine (Iodine-131 and Iodine-129) similar results of iodine absorption result.

Example 5

Thin sheets of poly(dimethyl butadiene) were formed from a hexane solution on a glass plate and drying. The sheets were placed in an enclosed container with iodine. The iodine vapor produced at room temperature interacted with the sheets and over a few hours turned those black in color. With time the iodine within the container was absorbed within the polymer sheets. By weighing the iodine intake in the sheets it was determined that the maximum molar concentration of iodine was about 0.8. The electrical conductivity of the sheets increased many orders of magnitude as a result of iodine doping. Inspection over many weeks of time showed that iodine remained trapped within the polymer. When this experiment is performed using radioactive iodine (Iodine-131 and Iodine-129) similar results of iodine absorption result.

Example 6

Thin sheets of styrene-butadiene-rubber (SBR) were formed from toluene solution on a glass plate and drying. The sheets were placed in an enclosed container with iodine. The iodine vapor produced at room temperature interacted with the sheets and over a few hours turned those black in color. With time the iodine within the container was absorbed within the polymer sheets. By weighing the iodine intake in the sheets it was determined that the maximum molar concentration of iodine was about 0.8. The electrical conductivity of the sheets increased many orders of magnitude as a result of iodine doping. Similar results were obtained when the polymer used was in form of small particulates. Inspection over many weeks of time showed that iodine remained trapped within the polymer. When this experiment is performed using radioactive iodine (Iodine-131 and Iodine-129) similar results of iodine absorption result.

Example 7

Thin films of polyalloocimene were formed from tetrahydrofuran (THF) solution on a glass plate and drying. The films were placed in an enclosed container with iodine. The iodine vapor produced at room temperature interacted with the sheets and over a few hours turned those black in color. With time the iodine within the container was absorbed within the polymer sheets. By weighing the iodine intake in the sheets it was determined that the maximum molar concentration of iodine was about 0.8. The electrical conductivity of the sheets increased many orders of magnitude as a result of iodine doping. Similar results were obtained when the polymer used was in form of small particulates. Inspection over many weeks of time showed that iodine remained trapped within the polymer. When this experiment is performed using radioactive iodine (Iodine-131 and Iodine-129) similar results of iodine absorption result.

Example 8

Thin films of polynorbornene were formed from benzene solution on a glass plate and drying. The films were placed in an enclosed container with iodine. The iodine vapor produced at room temperature interacted with the sheets and over a few hours turned those black in color. With time the iodine within the container was absorbed within the polymer sheets. By weighing the iodine intake in the sheets it was determined that the maximum molar concentration of iodine was about 0.8. The electrical conductivity of the sheets increased many orders of magnitude as a result of iodine doping. Similar results were obtained when the polymer used was in form of small particulates. Inspection over many weeks of time showed that iodine remained trapped within the polymer. When this experiment is performed using radioactive iodine (Iodine-131 and Iodine-129) similar results of iodine absorption will result.

Therefore, the advantages of the present invention are:
i) Nonconjugated conductive polymers having a double bond number fraction less than ½ are useful for protection against radiation including radioactive iodine.
ii) The nonconjugated conductive polymers absorb iodine atoms rendering them immobile within the polymer.
iii) The nonconjugated conductive polymers include: cis-1,4-polyisoprene (natural rubber), trans-1,4-polyisoprene (gutta percha), poly(β-pinene), polybutadiene, poly(dimethyl butadiene), styrene-butadiene-rubber (SBR), polyalloocimene and polynorbornene.
iv) The nonconjugated conductive polymers can be formed in any shape and structures and can absorb radioactive iodine up to a molar concentration of 1.0 or higher.
v) These polymers are stable under water, and therefore can absorb radioactive iodine under water.
vi) These polymers are useful for trapping radioactive iodine from nuclear waste materials at a much lower cost and providing other benefits compared to zeolite materials (silver-mordenite) presently used. Nuclear wastes are from nuclear power plants and need to be stored safely avoiding health hazards.
vii) These polymers can be mixed together to form a structure or substrate to absorb radioactive iodine.
viii) The substrate can consist entirely or nearly entirely of at least one nonconjugated conductive polymer or from two or more such polymers.
ix) The substrate can include other materials than a nonconjugated conductive polymer to provide strength and integrity to the structure.
x) The polymers can be used as particulates and can be sprayed (from liquid mixture/solution) on affected objects or environment.

xi) An entire nuclear power plant and/or the potentially affected regions can be covered with a thick (centimeter) sheet of such a polymer to prevent leaking of radioactive iodine to outside.

xii) The tank or container in which spent nuclear fuel rods are stored either temporarily or permanently can constructed from a nonconjugated conductive polymer containing either iodine or radioactive iodine.

xiii) The polymers can be formed as sheets from the polymer alone or a combination of these polymers and other materials.

xiv) These polymers with iodine can be formed as sheets placed either on the inside or outside of other materials to support the sheets or to be placed on the inside or outside of an existing structure.

I claim:

1. A process for protection against nuclear radiation including radioactive iodine by using at least one nonconjugated polymer to absorb iodine, including radioactive iodine.

2. The process of claim 1 in which the nonconjugated polymer is selected from the group consisting of cis-1,4-polyisoprene (natural rubber), trans-1,4-polyisoprene (gutta percha), poly(β-pinene), polybutadiene, poly(dimethyl butadiene), styrene-butadiene-rubber (SBR), polyalloocimene and polynorbornene.

3. The process of claim 2 in which the nonconjugated polymer is cis-1,4-polyisoprene (natural rubber).

4. The process of claim 2 in which the nonconjugated polymer is trans-1,4-polyisoprene (gutta percha).

5. The process of claim 2 in which the nonconjugated polymer is poly(β-pinene).

6. The process of claim 2 in which the nonconjugated polymer is polybutadiene.

7. The process of claim 2 in which the nonconjugated polymer is poly(dimethyl butadiene).

8. The process of claim 2 in which the nonconjugated polymer is styrene-butadiene-rubber (SBR).

9. The process of claim 2 in which the nonconjugated polymer is polyalloocimene.

10. The process of claim 2 in which the nonconjugated polymer is polynorbornene.

11. A process for protection against nuclear radiation, including radioactive iodine, in which an existing structure in which radioactive material is contained, by forming a coating or substrate on the existing structure from a material formed at least in part from at least one nonconjugated polymer.

* * * * *